(12) United States Patent
Carvelli et al.

(10) Patent No.: US 10,898,929 B2
(45) Date of Patent: Jan. 26, 2021

(54) BELLOWS CONNECTING ADJACENT CARRIAGES, IN PARTICULAR CARRIAGES OF A MATERIAL HANDLING SORTER

(71) Applicant: DEMATIC S.R.L., Cernusco sul Naviglio (IT)

(72) Inventors: Marco Carvelli, Segrate (IT); Emanuele Vaiti, Limbiate (IT)

(73) Assignee: DEMATIC S.R.L., Cernusco sul Naviglio (IT)

( * ) Notice: Subject to any disclaimer, the term of this patent is extended or adjusted under 35 U.S.C. 154(b) by 510 days.

(21) Appl. No.: 15/750,524

(22) PCT Filed: Aug. 10, 2015

(86) PCT No.: PCT/IT2015/000200
§ 371 (c)(1),
(2) Date: Feb. 6, 2018

(87) PCT Pub. No.: WO2017/025991
PCT Pub. Date: Feb. 16, 2017

(65) Prior Publication Data
US 2018/0221918 A1    Aug. 9, 2018

(51) Int. Cl.
*B07C 5/36* (2006.01)
*B65G 47/96* (2006.01)
*F16J 3/04* (2006.01)

(52) U.S. Cl.
CPC ............... *B07C 5/36* (2013.01); *B65G 47/96* (2013.01); *F16J 3/048* (2013.01); *Y10T 403/315* (2015.01)

(58) Field of Classification Search
CPC ..... B07C 5/36; B65G 47/96; F16J 3/04; F16J 3/041; F16J 3/047; F16J 3/048;
(Continued)

(56) References Cited

U.S. PATENT DOCUMENTS 2,707,117 A * 4/1955 Fentress ................ F16L 51/027
                                                                285/226
4,905,607 A    3/1990 Wanneroy
(Continued)

FOREIGN PATENT DOCUMENTS

EP    1 810 852 A1    7/2007
EP    2 386 432 A1    11/2011
(Continued)

OTHER PUBLICATIONS

International Search Report and Written Opinion for corresponding Patent Application No. PCT/IT2015/000200 dated Apr. 13, 2016.
(Continued)

*Primary Examiner* — Josh Skroupa
(74) *Attorney, Agent, or Firm* — Renner Otto Boisselle & Sklar, LLP

(57) ABSTRACT

A bellows (1) connecting adjacent carriages (3), in particular carriages of a material handling sorter (2) along a predetermined path (P), being robust and reliable, comprises opposite heads (4a, 4b) each being associated with a carriage (3) and a pleated structure (5) with a preset number of substantially M-shaped elements (6) being provided with a plurality of vertices (7), as well as a bearing structure (8) formed by a base structure (8') and by a frame (8") slidingly abutting on the base structure (8) such base structure (8') and such frame (8") being rigid and cooperating with each other, being placed between adjacent carriages inside the bellows (1).

14 Claims, 5 Drawing Sheets

(58) Field of Classification Search
CPC ......... F16J 15/52; F16J 15/525; F16L 27/111; F16L 51/026; Y10T 403/31; Y10T 403/315; Y10T 403/453
USPC ...... 464/175; 403/50, 51, 223; 285/226, 227
See application file for complete search history.

(56) References Cited

U.S. PATENT DOCUMENTS

| | | | | |
|---|---|---|---|---|
| 4,911,206 | A * | 3/1990 | Gropp | F16J 3/048 285/226 |
| 5,853,855 | A * | 12/1998 | Nemoto | F16J 3/041 428/176 |
| 8,733,777 | B2 * | 5/2014 | Junke | B60D 5/00 280/403 |
| 9,243,711 | B2 * | 1/2016 | Silveira | F16J 3/047 |
| 10,557,550 | B2 * | 2/2020 | Saindon | F16J 3/048 |

FOREIGN PATENT DOCUMENTS

| | | | | |
|---|---|---|---|---|
| EP | 2899433 | A1 * | 7/2015 | ............... F16J 3/048 |
| FR | 3006031 | A1 * | 11/2014 | ............ F16L 51/027 |
| JP | 200266866 | | 3/2002 | |
| WO | 2014011852 | | 1/2014 | |

OTHER PUBLICATIONS

European Patent Office, Notice of Opposition in EP Application No. 15794645.0/Patent No. EP3334671, dated Nov. 2, 2020.
VanDerLande Industries, Crossorter Brochure, Nov. 2007.
VanDerLande Industries, ASSY Carrier-Crossbelt CAD Drawing, Jun. 2, 2003.
VanDerLande ASSY Carrier SCCS 400 Flat CAD Drawing, May 12, 2003.
VanDerLande Industries, Screen SCS 400 CAD Drawing, Apr. 29, 2003.
VanDerLande Industries, Assembly Crossbelt (Flat) CAD Drawing, May 12, 2003.
VanDerLande Industries, Total Building Layout CAD Drawing, Sep. 22, 2003.
VanDerLande Industries, SCS 400 Carriers Game Stores Project Specification, Aug. 15, 2003.
Affidavit of Frits Verhees, Oct. 21, 2020.
Affidavit of Ron Jut, Oct. 22, 2020.
Still shots from video of test with Crossorter 400 Feb. May 2004.
Still shots from video of Game Stores premises (JLub) May 2004.
Consolidated List of Citations D1-D19 from Notice of Opposition in EP Application No. 15794645.0/Patent No. EP3334671, Nov. 2, 2020.

* cited by examiner

BELLOWS CONNECTING ADJACENT CARRIAGES, IN PARTICULAR CARRIAGES OF A MATERIAL HANDLING SORTER

This application is a national phase of International Application No. PCT/IT2015/000200 filed Aug. 10, 2015 and published in the English language.

APPLICATION FIELD

The present invention refers to a bellows.

More specifically, the invention refers to a bellows connecting adjacent carriages, in particular carriages of a material handling sorter and the following description is carried out with reference to this application field with the only purpose of simplifying the exposition.

PRIOR ART

As it is well known, a bellows is a covering element generally having a pleated structure, having a predetermined number of substantially M-shaped elements usually being made of a pleated nylon fabric.

Those bellows are particularly used in the material handling, for example in the so-called sorter handlers, each bellows being extended between a carriage and the adjacent carriage, in order to cover the space between the carriages.

The bellows can also comprise plate-shaped inserts, inserted in said substantially M-shaped elements and each contacting on the upper part an internal vertex of one of said substantially M-shaped elements.

Nevertheless, those bellows are completely passive elements, without any ability of sustaining any possible accidental load, incident from the outside, as it would be in the case where objects having very different weight and/or dimension from each other are to be managed, as it is typical for the parcel sector (couriers and shipping agents) and where it happens that some objects can overflow, in part or entirely, from the carriage wherein they were intended.

The known bellows, in the case of objects being accidentally weighing thereon, are deformed, warped, and even broken, incurring in failures of the system operation.

Trying to overcome these drawbacks, the bellows often are disused in favor of telescopic coverages incurring in building difficulties and in operational limitations, for example regarding the path of the carriages on bends.

A technical problem addressed by the present invention is to provide a bellows having such structural and functional features as to overcome the drawbacks mentioned with reference to the prior art bellows.

SUMMARY OF THE INVENTION

The above-mentioned technical problem is solved by a bellows connecting adjacent carriages, in particular carriages of a material handling sorter along a predetermined path, comprising opposite heads each being associated with a carriage and a pleated structure having a predetermined number of substantially M-shaped elements provided with a plurality of vertices, characterized in that it comprises a bearing structure formed by a base structure and by a frame slidingly abutting on said base structure, said base structure and said frame being rigid and cooperating with each other, being arranged between adjacent carriages inside said bellows.

More particularly, the invention provides the following additional and optional features, being taken individually or together when needed.

According to another aspect of the invention, the base structure can comprise shelves, each being associated with a respective head and cantilevering therefrom.

In particular, each of those shelves is divided into a plurality of shelves being suitably staggered in order to insert into each other like a comb, when pulling together and separating the carriages.

Each shelf can further comprise a slat integral with the shelves forming a substantially right angle-shaped element, those slat being associated with a respective head.

According to another aspect of the invention, the frame can comprise a plurality of sheet inserts arranged inside the bellows having a pressing contact along respective vertices and slidingly abutting at the bottom on the shelves of the base structure, in order to support the pleated structure.

In particular, each sheet insert can comprise a core sandwiched by two opposite metal covers, the entirety of the metal covers defining an extrados having a pressing contact with a respective vertex.

According to another aspect of the invention, the metal covers can have wings on the bottom being right angle laterally bent, slidingly abutting on a respective shelf of the base structure.

In particular, the wings can comprise respective pairs of small wings facing towards a respective head, small wings of different metal covers associated with the same core being placed back-to-back, in opposite directions and having a predetermined corresponding width, defining a gap therebetween and forming, with respective small wings of a metal cover of an adjacent sheet insert, respective supporting feet having a pressing and sliding contact with one of the shelves.

According to another aspect of the invention, the cores of the sheet inserts can comprise protrusions facing downwards so as to follow the shape of the cover sandwiching them.

According to another aspect of the invention, the cores of the sheet inserts can be made of an elastomeric material, in particular PVC and the metal covers of the sheet inserts can be made of steel.

Moreover, the metal covers of the sheet inserts can have strengthening teeth facing downwards and arranged having a pitch corresponding to holes made in the covers themselves for the riveting.

The problem is also solved by a bearing structure for a bellows connecting adjacent carriages, in particular carriages of a material handling sorter along a predetermined path, comprising opposite heads each being associated with a carriage and a pleated structure having a predetermined number of substantially M-shaped elements provided with a plurality of vertices, such bearing structure comprising a base structure and a frame slidingly abutting on the base structure, being rigid and cooperating with each other, being arranged between adjacent carriages inside the bellows.

The characteristics and advantages of the bellows and bearing structure according to the invention will be apparent from the following description of an embodiment thereof given by way of a non-limiting example with reference to the attached drawings.

DETAILED DESCRIPTION

Figure 1:
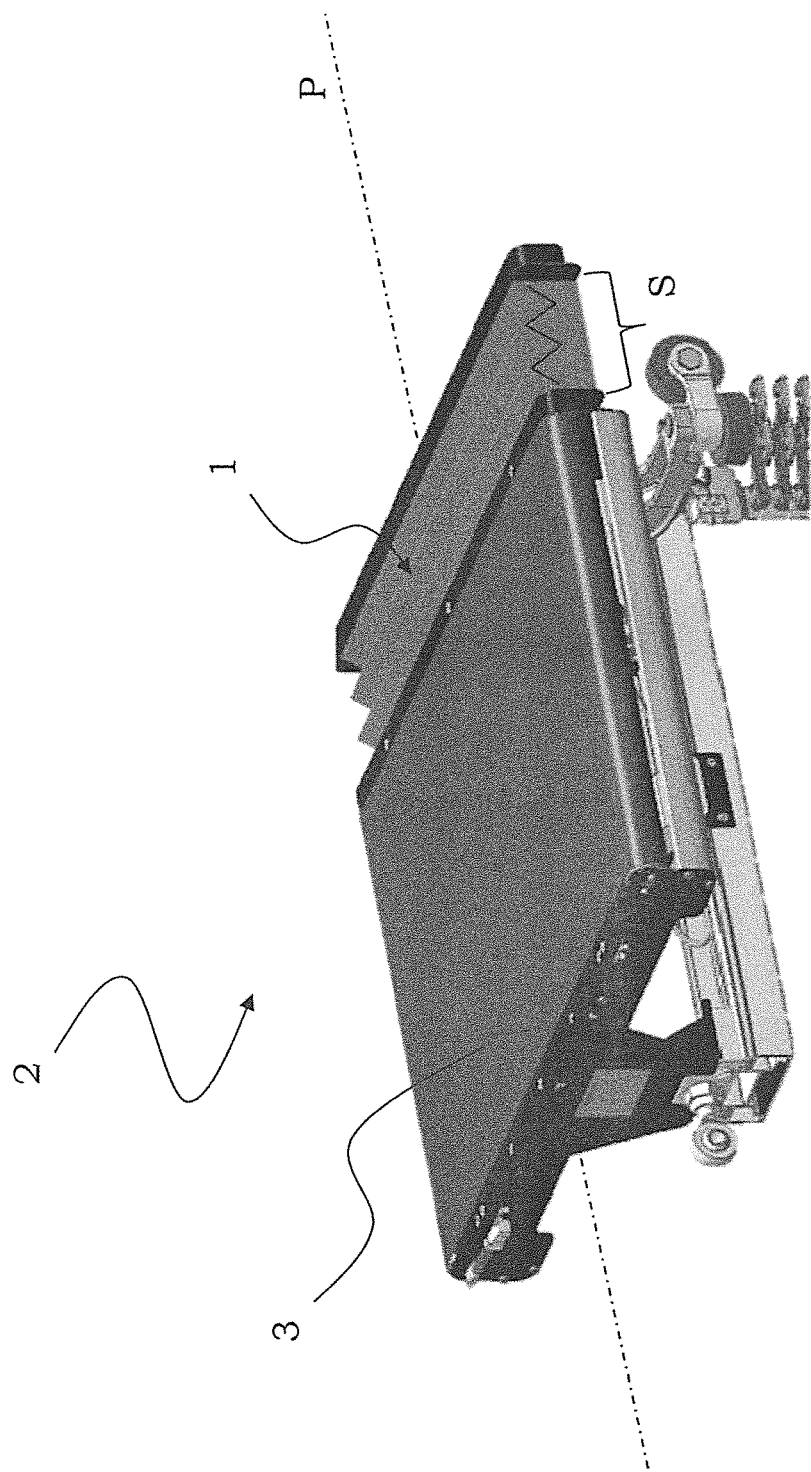
FIG. 1 represents a schematic perspective view of a sorter comprising a bellows according to the invention.
Figure 2:
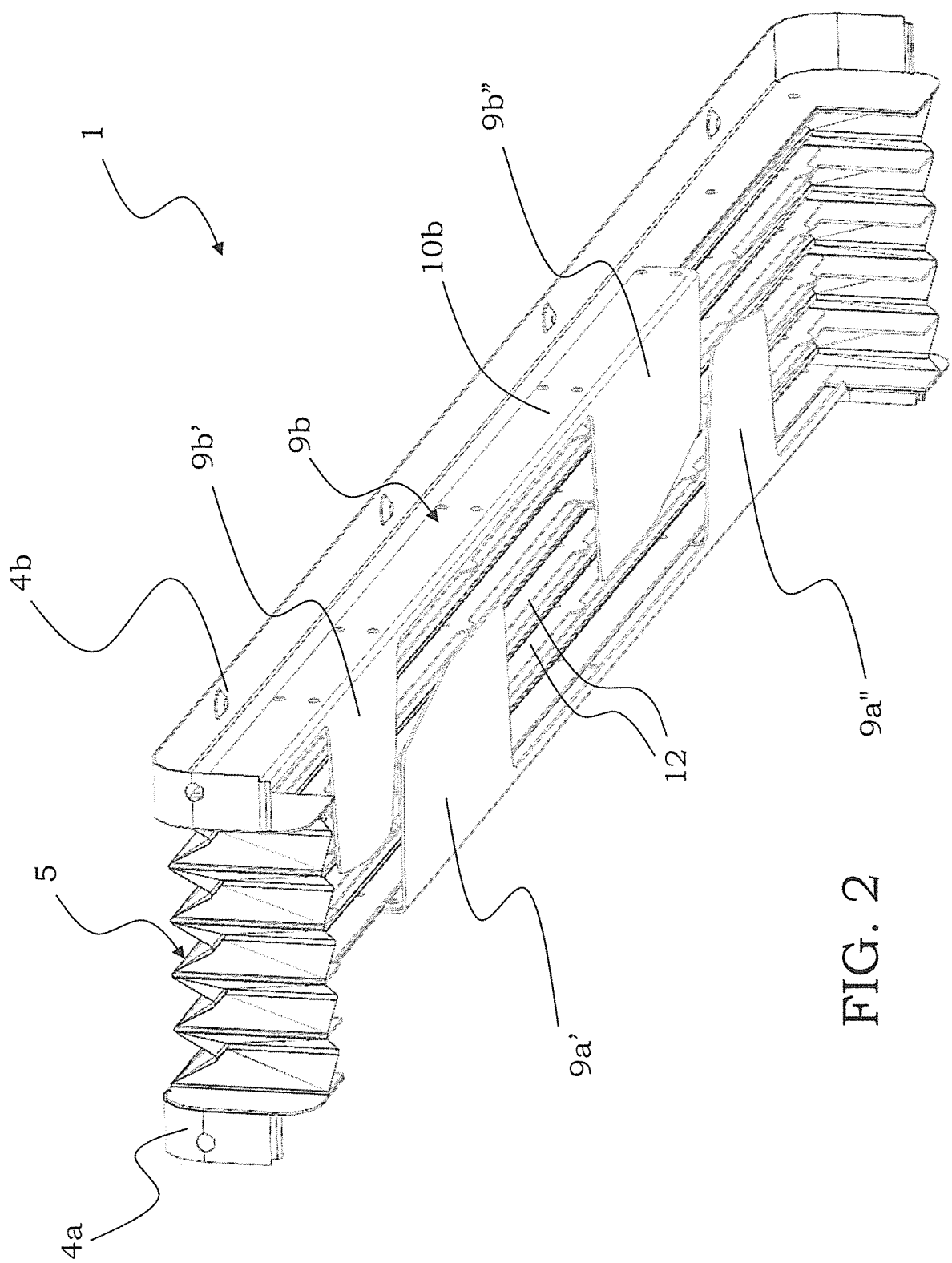
FIG. 2 represents a bottom perspective view of a bellows according to the invention.
Figure 3:
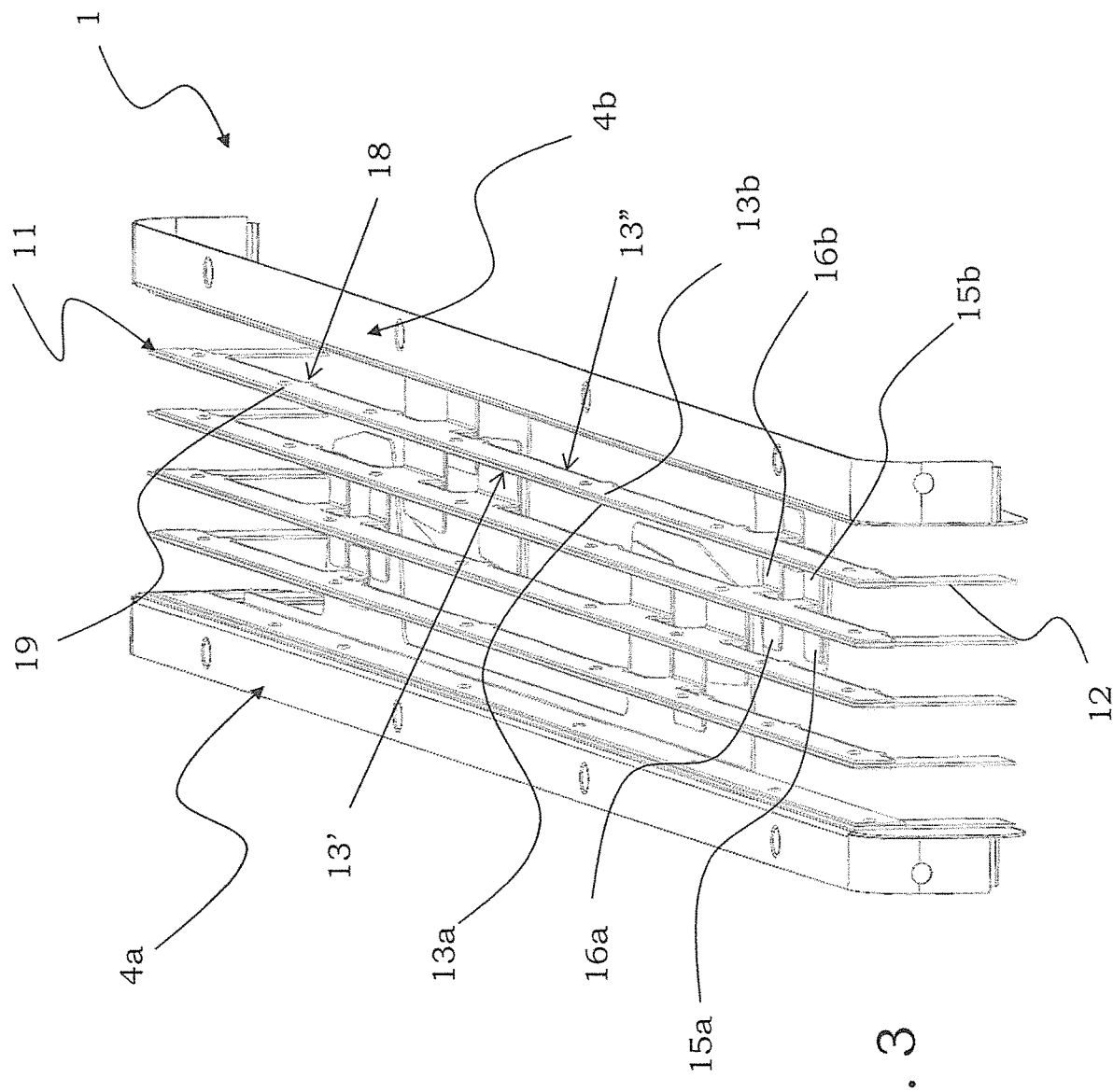
FIG. 3 represents a top perspective view of the bellows of FIG. 2 from another angle.
Figure 4:
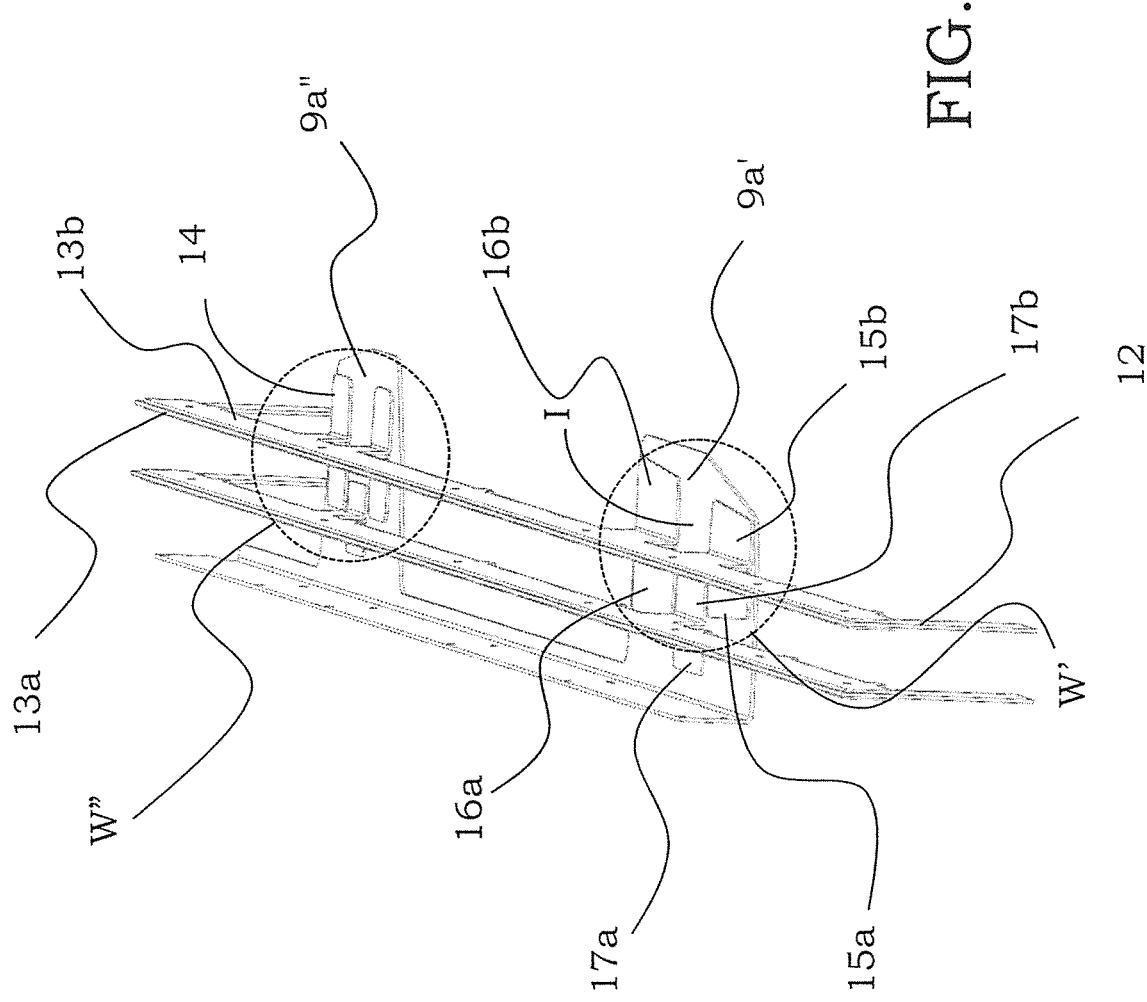
FIG. 4 represents a top perspective view of a detail of the bellows of FIG. 3.
Figure 5:
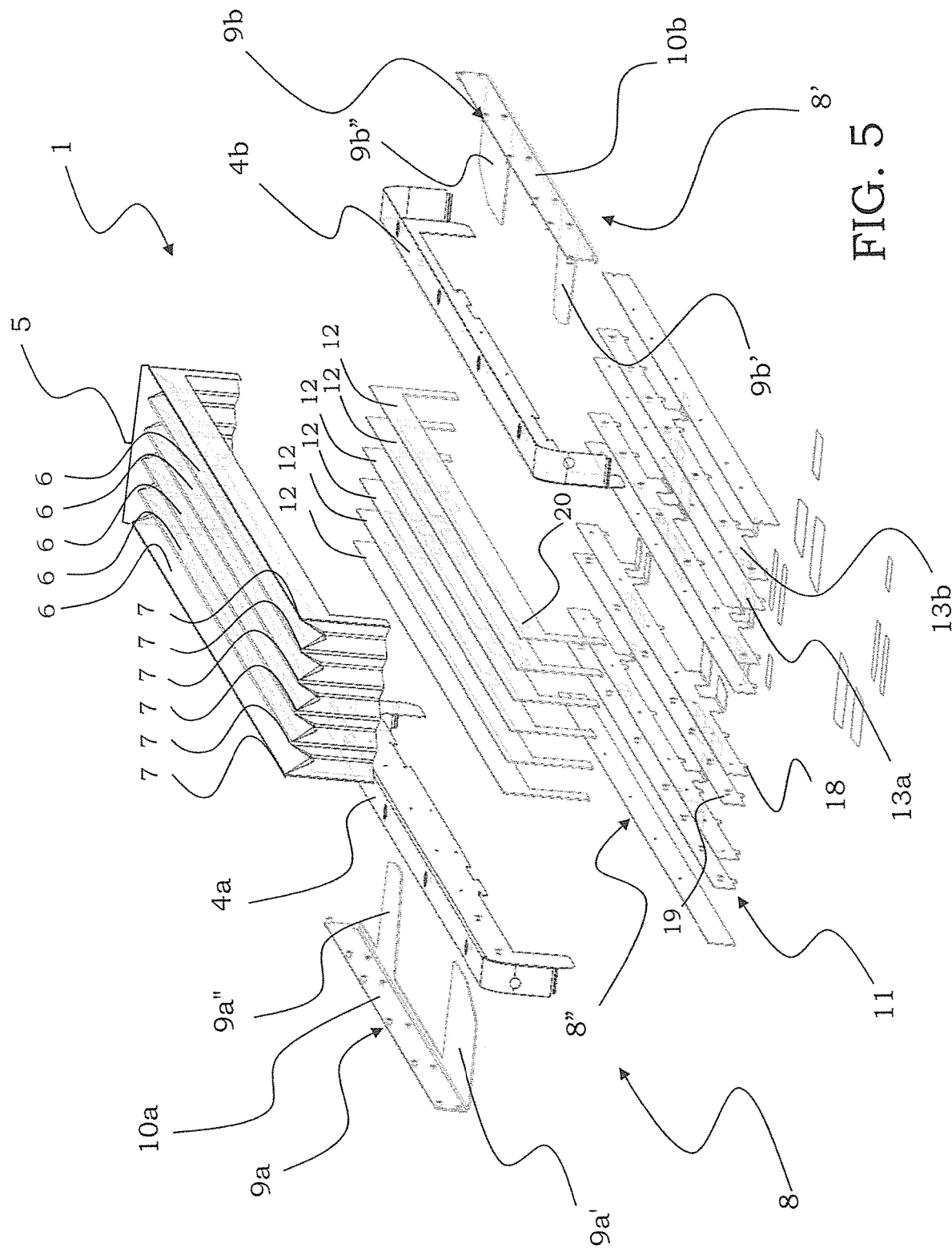
FIG. 5 represents an exploded top perspective view of the bellows of FIG. 2.

With reference to the attached figures, a bellows according to the invention is globally indicated with 1 being usable within a sorter 2, in an extended position between a carriage 3 and an equal carriage (not shown), running along a path P of the sorter 2 itself; the bellows extends in order to cover the space S between the carriages and to connect the carriages themselves along the path P.

The bellows 1 comprises opposite heads, 4a and 4b, each being associated with a respective carriage, in particular the head 4a being associated with the carriage 3 and the head 4b to the adjacent carriage. The bellows 1 also comprises a pleated structure 5, formed by a predetermined number of substantially M-shaped elements, all indicated with 6, five in the described example. Such substantially M-shaped elements 6 define a plurality of vertices, all indicated with 7, six in the described example.

More particularly, of the substantially M-shaped elements 6, the ones that are at the ends of the pleated structure 5 are integral to the heads 4a and 4b.

The bellows 1 according to the present invention also comprise a bearing structure 8, which is substantially accommodated in the space S between adjacent carriages, and is inside the bellows 1 being placed to cover that space S.

The bearing structure 8 is formed by two different structures, being rigid and cooperating with each other, and precisely by a base structure 8' and a frame 8" slidingly abutting on the base structure 8'.

The base structure 8' is provided with shelves 9a, 9b, each being associated with a respective head 4a, 4b and cantilevering in the space S between a carriage and the adjacent one.

In particular, the shelves 9a being associated with the head 4a are two, indicated with 9a' and 9a" as well as the shelves 9b being associated with the head 4b are two, indicated with 9b' and 9b", bearing in mind that the shelves are suitably staggered in order to insert into each other like a comb, when pulling together and separating the carriages.

Structurally, it must be noted that the shelves 9a' and 9a" are integral with a slat 10a forming a substantially L or right angle-shaped element, such slat 10a being associated with the respective head 4a. Similarly, the shelves 9b' and 9b" are integral with a slat 10b forming a further substantially right angle-shaped element being symmetrical to the former, such slat 10b being associated with the respective head 4b.

The frame 8" comprises a plurality of sheet inserts, all globally indicated with 11, being arranged in the bellows 1 having a pressing contact along respective vertices 7 and slidingly abutting on the bottom on the shelves 9a, 9b of the base structure 8', in order to support the pleated structure 5.

In the described example, each sheet insert 11 includes a core 12, being preferably made of an elastomeric material, for example PVC, sandwiched by two opposite metal covers 13a, 13b, being preferably made of steel. The entirety of the metal covers 13a, 13b defines an extrados 13', having a pressing contact with a respective vertex 7 and an opposite intrados 13".

The metal covers 13a, 13b have wings 14 on the bottom being right angle laterally bent, slidingly abutting on a respective shelf 9a, 9b of the base structure 8'.

In the described example, the wings of the metal cover 13a are made of a pair of small wings 15a and 16a facing the head 4a, while the wings of the metal cover 13b are made of a pair of small wings 15b and 16b facing the head 4b. It must be noted that the small wings 15a, 16a, 15b, 16b are placed back-to-back, in opposite directions and have a predetermined corresponding width, defining a gap I therebetween.

Similarly, the covers of an adjacent sheet insert have small wings 17a, 17b, which are respectively facing the heads 4a and 4b, are placed back-to-back and have a predetermined limited width being substantially equal to the gap I. It must be noted that the small wings 15a, 15b, 16a, 16b, 17a, 17b as a whole form a sort of supporting foot, globally indicated with W' in the figure, having a pressing and sliding contact with one of the shelves, in particular with the shelf 9a' of the base structure 8'.

In a similar way, a supporting foot W" is obtained with right angle folded wings having a reduced width and abutting the shelf 9a" of the base structure 8'.

In the shown example, the metal covers 13a, 13b of the sheet inserts 11 have strengthening teeth 18 at the intradoses 13", facing downwards and being arranged having a pitch corresponding to holes 19 made in the covers and intended for the riveting, in particular in a slat horizontal portion thereof. Thereby, the strengthening teeth 18 form a strengthening of the sheet inserts 11 at the weakening being caused by the holes 19 for the riveting.

It must also be noticed that the cores 12 being made of PVC have protrusions 20 facing downwards following the shape of the covers 13a, 13b sandwiching them. Thereby, the sheet inserts 11 have the vertical portion made of a metal/PVC/metal multilayer, only the right angle portion of the wings 14 being made of metal only.

Preferably, resolings are provided at the small wings 15a, 15b, 16a, 16b, 17a, 17b with sheets made of a proper material, in particular an adhesive antifriction or self-lubricant material, so as to facilitate the sliding of the supporting feet W', W" on the respective shelves 9a', 9a" of the base structure 8'.

It must be noted that the present invention also provides a bearing structure 8 for a bellows 1 connecting adjacent carriages 3, in particular carriages of a material handling sorter 2 along a preset path P, the bellows comprising opposite heads 4a, 4b, each being associated with a carriage 3 and a pleated structure 5 having a predetermined number of substantially M-shaped elements 6 provided with a plurality of vertices; in particular the bearing structure 8 comprises a base structure 8' and a frame 8" slidingly abutting on the base structure 8', being rigid and cooperating with each other, being arranged between adjacent carriages inside the bellows 1.

A bellows according to the invention may have an unusual strength, lending an unexceptionable operating safety to the sorter where it is intended, also in the occurrence of objects to be transported possibly overflowing from the carriages.

A bellows according to the invention may have a simple structure, which is a non-negligible advantage for an item intended for a large or very large scale production.

A bellows according to the invention may have the advantage to be easily realized in field and applied to existing sorters, starting from known bellows.

Finally, a bellows according to the invention may have a long useful life with constant efficiency.

Obviously, in order to meet contingent and specific requirements, a skilled person in the art could bring several changes and variations to the above described bellows, all included within the scope of protection of the invention as defined by the following claims.

The invention claimed is:

1. A bellows connecting adjacent carriages of a material handling sorter along a predetermined path, the bellows comprising:
    opposite heads each being associated with a carriage, and
    a pleated structure having a predetermined number of substantially M-shaped elements provided with a plurality of vertices,
    wherein the bellows comprises:
    a bearing structure formed by a base structure and by a frame slidingly abutting on the base structure, the base structure and the frame being rigid and cooperating with each other, being disposed between adjacent carriages inside the bellows.

2. The bellows according to claim 1, wherein the base structure of the bearing structure comprises shelves, each being associated with a respective head and cantilevering therefrom.

3. The bellows according to claim 2, wherein each shelf is divided into a plurality of shelves being staggered to insert into each other like a comb, when pulling together and separating the carriages.

4. The bellows according to claim 3, wherein each shelf further includes a slat being integral with the shelves forming a substantially right angle-shaped element, the slat being associated with a respective head.

5. The bellows according to claim 4, wherein the frame of the bearing structure comprises a plurality of sheet inserts being arranged inside the bellows having a pressing contact along respective vertices and slidingly abutting at the bottom on the shelves of the base structure, to support the pleated structure.

6. The bellows according to claim 5, wherein each sheet insert comprises a core being sandwiched by two opposite metal covers, the metal covers as a whole defining an extrados, having a pressing contact with a respective vertex.

7. The bellows according to claim 6, wherein the metal covers have wings on the bottom being right angle laterally bent, slidingly abutting on a respective shelf of the base structure of the bearing structure.

8. The bellows according to claim 7, wherein each wing comprises respective pairs of small wings facing towards a respective head, small wings of different metal covers associated with the same core being placed back-to-back, in opposite directions and having a predetermined corresponding width, defining a gap therebetween and forming, with respective small wings of a metal cover of an adjacent sheet insert, respective supporting feet having a pressing and sliding contact with one of the shelves.

9. The bellows according to claim 8, wherein the cores of the sheet inserts comprise protrusions facing downwards so as to follow the shape of the covers sandwiching them.

10. The bellows according to claim 6, wherein the cores of the sheet inserts are made of an elastomeric material.

11. The bellows according to claim 6, wherein the cores of the sheet inserts are made of PVC.

12. The bellows according to claim 6, wherein the metal covers of the sheet inserts are made of steel.

13. The bellows according to claim 6, wherein the metal covers of the sheet inserts comprise strengthening teeth and holes, the strengthening teeth facing downwards and being arranged having a pitch corresponding to the holes for the riveting.

14. A bearing structure for a bellows connecting adjacent carriages of material handling sorter along a predetermined path, comprising:
    opposite heads each being associated with a carriage, and
    a pleated structure having a predetermined number of substantially M-shaped elements provided with a plurality of vertices,
    the bearing structure comprising a base structure and a frame slidingly abutting on the base structure, being rigid and cooperating with each other, being disposed between adjacent carriages inside the bellows.

* * * * *